United States Patent [19]

Simmons et al.

[11] Patent Number: 5,721,527

[45] Date of Patent: Feb. 24, 1998

[54] METHOD FOR VERIFICATION OF VEHICLE AIRBAG DELETION

[75] Inventors: Paul Simmons, Chesterfield; J. B. Drummond, Jr., Southfield; Matt A. Niesluchowski, Troy; Mark A. Cuddihy, New Boston; Richard M. Ross, Grosse Ile, all of Mich.

[73] Assignee: Ford Global Technologies, Inc., Dearborn, Mich.

[21] Appl. No.: 796,359

[22] Filed: Feb. 7, 1997

[51] Int. Cl.$^6$ ........................................ B60Q 1/00
[52] U.S. Cl. ................. 340/438; 340/522; 307/10.1; 280/728.1; 280/731; 280/735
[58] Field of Search .............................. 340/438, 439, 340/459, 522; 307/9.1, 10.1; 280/731, 734, 735, 728.1

[56] References Cited

U.S. PATENT DOCUMENTS

| 5,423,569 | 6/1995 | Reighard et al. | 280/731 |
| 5,501,486 | 3/1996 | Fujita et al. | 340/438 |
| 5,516,143 | 5/1996 | Lang et al. | 280/728.3 |
| 5,600,300 | 2/1997 | Povilaitis | 340/438 |
| 5,611,565 | 3/1997 | Inaba et al. | 280/728.3 |

OTHER PUBLICATIONS

Ford Motor Co. Service Manual for 1996 Contour, Mystique pp. 01-20B-1 through 01-20B-13.

*Primary Examiner*—Jeffery Hofsass
*Assistant Examiner*—Davetta Woods
*Attorney, Agent, or Firm*—Peter Abolins

[57] ABSTRACT

Vehicles normally equipped with safety airbags in the steering wheel and dashboard can be modified by deleting the airbags. A method for ensuring that the modifications are properly made, involves the use of an indicator light on the vehicle instrument panel and an electrical circuit that turns the indicator light off when the airbag deletion hardware is properly installed. The electric circuit includes light energizer circuits in the steering wheel and dashboard, and a shorting bar in each energizer circuit.

5 Claims, 3 Drawing Sheets

METHOD FOR VERIFICATION OF VEHICLE AIRBAG DELETION

BACKGROUND OF THE INVENTION

1. Field of the Invention

This invention relates to vehicle airbags, and particularly to a method of installing airbag-related hardware in situations where it is not desired to have an airbag in the vehicle.

2. Description of the Related Prior Art Developments

A conventional vehicle airbag system comprises various components, including two crash sensors, a safing sensor, one or more airbags, a diagnostic monitor, and an indictor light responsive to the condition of the monitor. The driver side airbag is located within the steering wheel, whereas the passenger side airbag is located in the dashboard. Each airbag assembly includes an ornamental panel or cover designed to conceal the airbag components.

When it is desired to delete the airbag feature, each airbag assembly is replaced with an ornamental cover or panel designed for positionment in the space otherwise occupied by the respective airbag. The appearance of the steering wheel and dashboard is maintained, except for pictorial information or wording embossed into the respective cover (on the steering wheel or dashboard). In a vehicle equipped with airbags each ornamental cover will sometimes have a pictorial representation of an airbag or indicia indicating the presence of an airbag behind the respective cover. In a vehicle wherein the airbags are deleted the ornamental covers will lack the airbag indicia.

An installation problem can arise, due to an occasional inadvertent inclusion of airbags into a vehicle, where it was not intended to have such airbags. The problem is due, in part, to the fact that the installation spaces on the steering wheel and dashboard are common for all vehicles of a particular model. As regards mounting attachments, the ornamental covers and airbag assemblies are similar, such that it is physically possible for an installer to mistakenly mount an airbag in a vehicle not intended to have such an airbag.

SUMMARY OF THE INVENTION

The present invention relates to a reliable method of installing ornamental covers on steering wheels and dashboards, in every case where the vehicle is not intended to have an airbag. The aim is to avoid the situation in which an airbag is inadvertently installed in a vehicle not otherwise wired to receive the airbag.

In a vehicle that is to be equipped with one or more airbags the electrical harness is often designed so that the physical process of installing the airbag(s) results in extinguishment of the aforementioned indicator light; the light extinguishment event gives the installer assurance that the airbag system is properly installed (in an electrical sense). The present invention concerns a method of installing airbag deletion hardware, wherein the indicator light is similarly extingushed; the aim is to assure the installer that the airbag deletion hardware is properly installed.

In practicing the method, the vehicle designer provides a unique electrical harness in the vehicle for situations where it is desired to delete (not use) the airbags. The harness includes an indicator light and two sets of electrical contacts that are not compatible with airbag connection to the harness. One set of contacts is located within the cover installation space in the steering wheel; the other set of contacts is located in the cover installation space in the dashboard.

To effect a desired cover installation process the installer is required to physically connect both sets of electrical contacts in the electrical harness; the electrical harness is designed so that when the connections are properly made the indicator light is transitioned from an "on" condition to an "off" condition. In preferred practice of the invention, the connections used to delete the airbag(s) are reversed and/or differently configured (compared to the connections used to achieve an airbag system); this feature precludes the installer inadvertantly installing airbag hardware instead of airbag deletion hardware. Since the connections are non-compatible (i.e. not usable) with the airbags, the installer is forestalled from attempting to mount airbags in the steering wheel and dashboard.

Further features of the invention will be apparent from the drawings and description of an apparatus usable in practice of the invention.

DESCRIPTION OF A PREFERRED EMBODIMENT OF THE INVENTION

Figure 1:
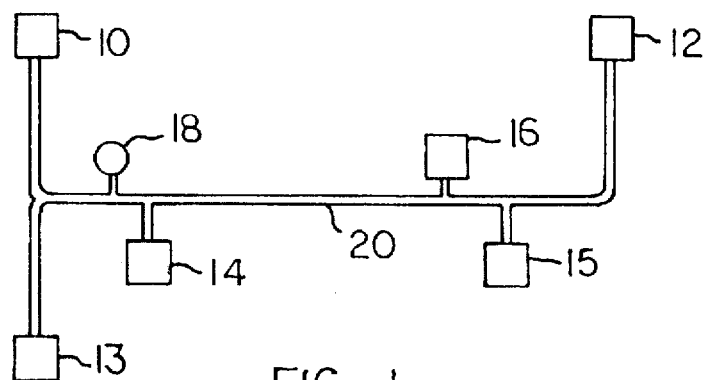
FIG. 1 schematically illustrates, in block form, a typical vehicle airbag installation on which the invention can be practiced.

Referring to FIG. 1, there is shown a conventional vehicle airbag system that includes right and left crash sensors 10 and 12 located at the front end of the vehicle, a safing (crash-confirmation) sensor 13 located in a side wall of the vehicle, a driver airbag 14 located in the steering wheel, and a passenger airbag 15 located in the vehicle dashboard facing the passenger space in the front seat. The system further includes a diagnostic monitor 16 located within the dashboard, and an indicator light 18 located on the instrument panel. The various components are interconnected by an electrical harness 20.

Figure 2:
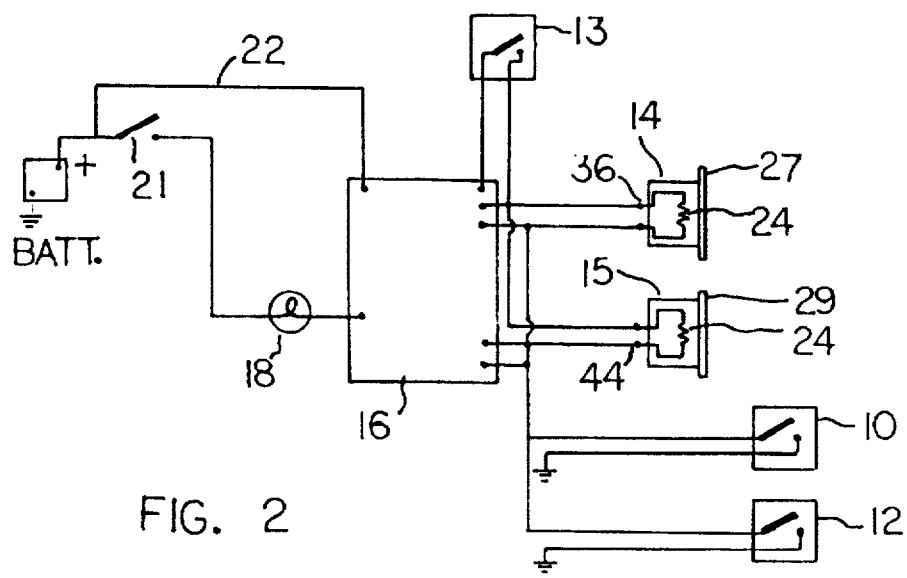
FIG. 2 illustrates electrical connections in the FIG. 1 airbag installation.

As shown in FIG. 2, the system includes an engine ignition switch 21 supplying current to indicator light 18 that is in circuit with the diagnostic monitor. The light is usually located on the instrument panel. The diagnostic monitor detects faults in the operating components, and delivers fault signals to indicator light 18. The indicator light displays particular faults as a series of flashes unique to particular faults, according to a fault code designed into the monitor.

The monitor includes internal circuit means that causes indicator lamp 18 to be illuminated for about six seconds after ignition switch 21 is turned on during normal vehicle operation; this is for the purpose of showing that the lamp is operational.

Figure 4:
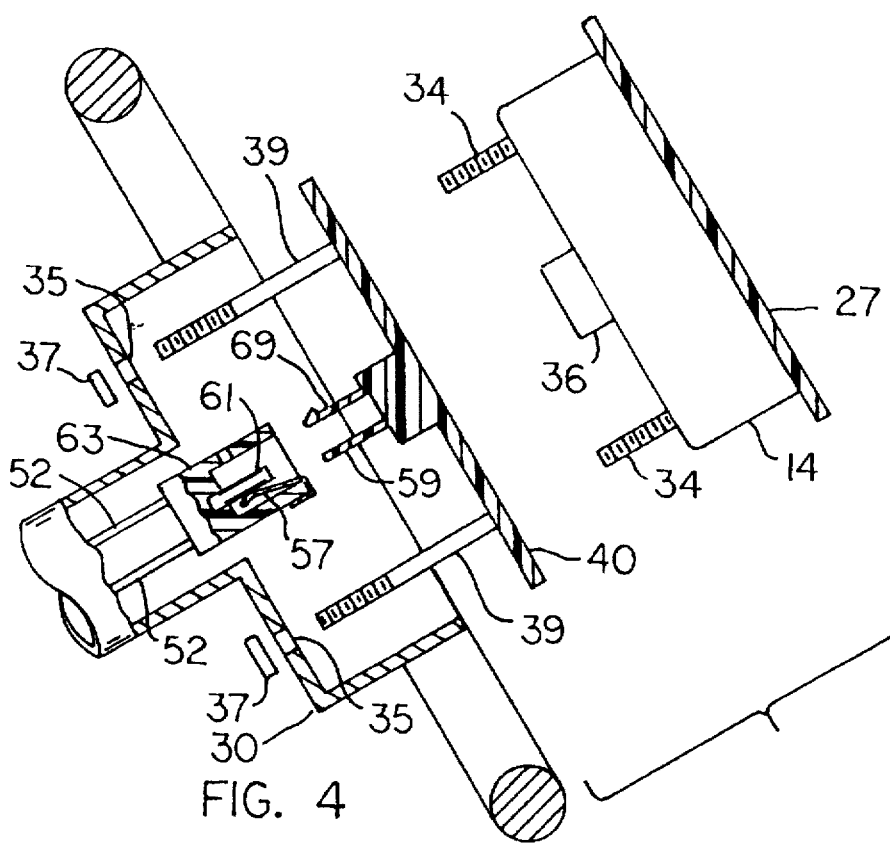
FIG. 4 shows a steering wheel and ornamental cover used thereon when it is desired to delete the driver's airbag.
Figure 5:
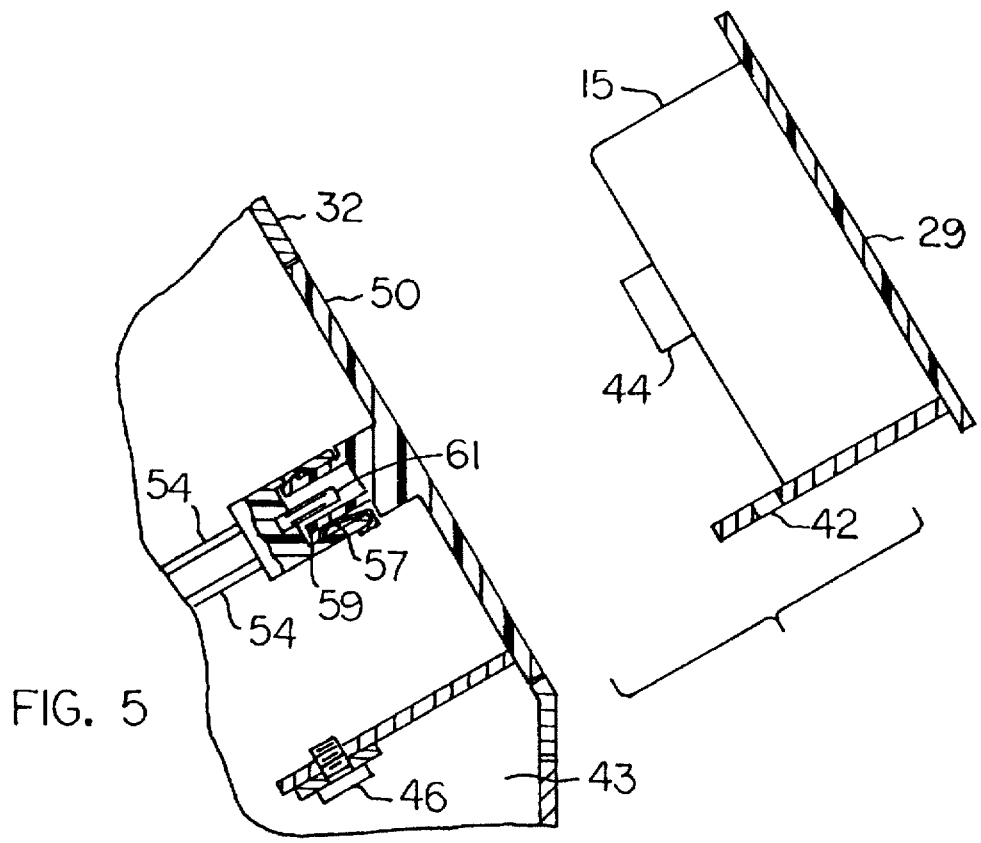
FIG. 5 fragmentarily shows a vehicle dashboard and ornamental cover used thereon when it is desired to delete the passenger airbag.

The various sensors and airbags are powered directly from the battery, via circuit line 22. Each airbag is a self-contained assembly that includes an electrical ignitor 24, a gas-generating chemical mix ignited by the ignitor, and an inflatable airbag folded around the gas generator. The assembly further includes an ornamental cover 27 or 29 designed to fit into the necessary installation opening in the steering wheel or dashboard. FIGS. 4 and 5 show typical air bag assemblies in side elevation, detached from the associated steering wheel 30 (FIG. 4) or dashboard 32 (FIG. 5).

FIG. 4 is an exploded view showing the driver airbag installation space adapted to alternately receive an airbag 14-cover 27 assembly or an ornamental cover 40. As shown in FIG. 4, the driver side airbag has four studs 34 adapted to extend through mounting holes 35 in the steering wheel to receive fastener nuts 37 at the rear surface of the steering wheel. Lead wiring extends through the steering wheel for electrical connection to an electrical terminal means 36 located on the rear face of the airbag assembly. After the electrical connections have been made, the airbag assembly is positioned in the steering wheel cavity, and secured by means of the aforementioned fastener nuts 37. When it is desired to delete (not use) the driver airbag, an ornamental cover 40 is substituted for the airbag assembly. The ornamental cover has four studs 39 for attaching the cover to the steering wheel. In external appearance cover 40 is generally similar to cover 27 on the deleted airbag.

FIG. 5 is an exploded view showing the passenger airbag installation space adapted to alternately receive an airbag 15-cover 29 assembly or an ornamental cover 50. As shown in FIG. 5, the passenger airbag assembly has mounting holes 42 cooperable with fastener bolts 46 for mounting the assembly in an installation space in the dashboard. Typically the fastener bolts are accessible through the glove box 43 located on the underside of the dashboard. Electrical terminal means 44 extends from the airbag assembly for connection with lead wires located within the dashboard.

When it is desired to delete the passenger airbag, an ornamental cover 50 is fastened to the dashboard, using the same mounting brackets and fastener bolts. Cover 50 has the same external shape and general appearance as cover 29 on the airbag. FIG. 5 shows the airbag assembly detached from the dashboard and replaced by cover 50.

FIG. 2 shows an electrical circuit for delivering electrical power to the airbag ignitors 24 under the control of sensors 10, 12 and 13.

Figure 3:
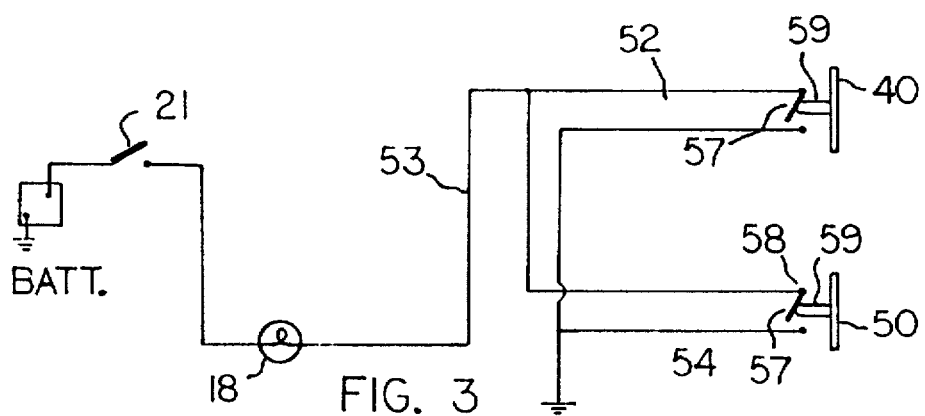
FIG. 3 shows an electrical circuit used in place of the FIG. 2 circuit when it is desired to delete the airbags and associated components.

FIG. 3 shows a second electrical circuit 53 that is used when the airbag delete option is used, i.e. when covers 27 and 50 are used in lieu of the airbags. In this situation, the diagnostic monitor and the various sensors are omitted. The circuit includes lead wires 52 extendible through the steering column into the steering wheel, and lead wires 54 extendible into the installation space in the dashboard. These lead wires terminate in electrical terminal means 56 and 58 that are normally connected by shorting bars 57. Each cover 40 or 50 has a dielectric deflector means 59 adapted to engage one of the shorting bars 57 during the operation of installing the cover. The deflector means physically displaces the associated shorting bar out of electrical connection with contacts 56.

The FIG. 3 circuit includes two parallel light-energizer circuits 52 or 54. Light 18 is energized by either one or both of these circuits. However, when both covers 40 and 50 are properly installed, both light energizer circuits are broken by the deflectors 59, such that the light is extinguished. Extinguishment of the indicator light provides the installer assurance that the two covers 40 and 50 are properly installed.

FIGS. 4 and 5 show one way that the shorting bars and deflectors can be constructed. Referring to FIG. 4, lead wires 52 are electrically connected to two parallel prongs 61 (only one shown) in housing 63. The shorting bar comprises a spring metal blade 57 normally spanning the two prongs, whereby a circuit is established across lead wires 52, 52. When the cover 40 (or 50) is manipulated, toward housing 63, dielectric plate 59 deflects the metal blade 57 away from prongs 61, thereby interrupting the lamp energizer circuit. A latch arm 69 is carried by the cover for holding the cover and housing 63 together while the cover is being fastened to the steering wheel (or dashboard).

FIG. 4 shows the lamp energizer circuit in a completed condition (via the shorting bar). FIG. 5 shows the lamp energizer circuit disconnected by deflector plate 59. Similar connection technology can be used in the steering wheel (FIG. 4) and in the dashboard (FIG. 5).

Figure 6:
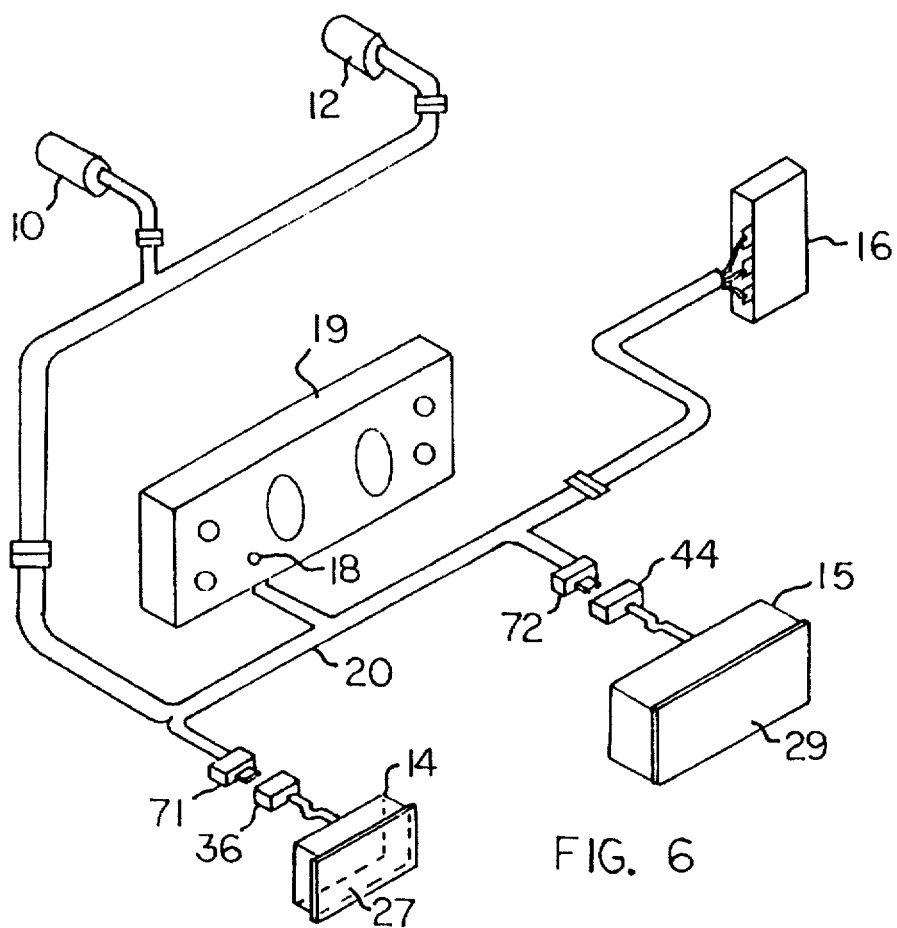
FIG. 6 schematically illustrates a typical airbag installation of the type depicted generally in FIG. 1.
Figure 7:
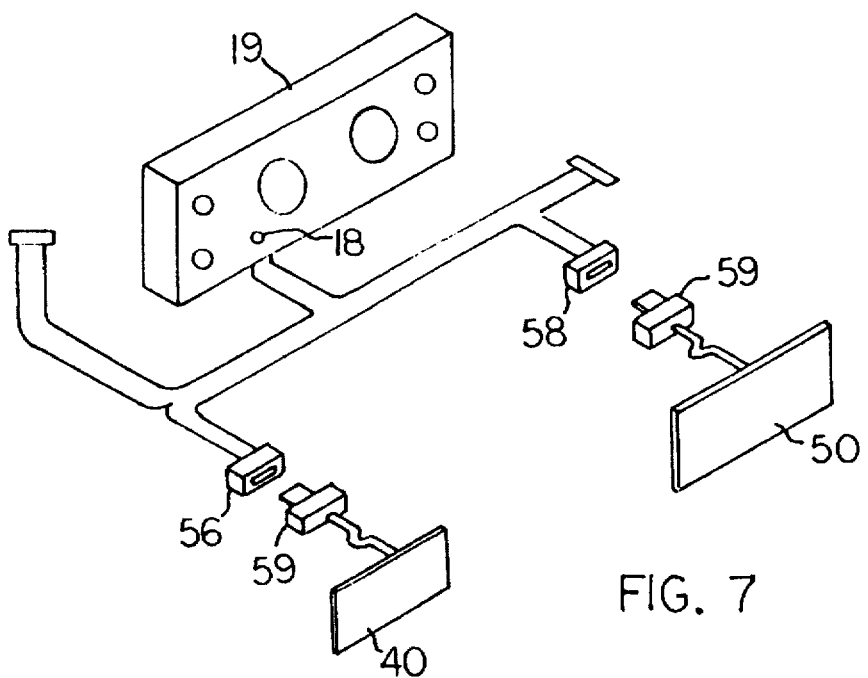
FIG. 7 shows that FIG. 6 installation modified to delete the airbags and associated equipment.

FIGS. 6 and 7 show further features of the invention. As shown in FIG. 6, the wiring harness 20 associated with instrument panel 19 has terminal means 71 and 72 adapted to register with terminal means 36 and 44 on the respective airbags 14 and 15. In this case each terminal means 71 or 72 has a male configuration, whereas each airbag terminal means 36 or 44 has a female configuration.

As shown in FIG. 7, each terminal means 56 or 58 has a female configuration, whereas each deflector means 59 has a male configuration. The mating plug-socket connections are reversed from the live airbag installation (FIG. 6) to the airbag delete installation (FIG. 7). This feature prevents the installer from physically connecting an airbag to a harness designed to receive the airbag delete hardware.

Deflector means 59 can be attached directly to cover 40 or 50, as shown in FIGS. 3, 4 and 5. Alternately, the deflector means can have a flexible cable connection to the associated cover, as shown in FIG. 7. Various alternative arrangements can be used in carrying out the invention.

What is claimed is:

1. A method of installing ornamental covers on a steering wheel and dashboard of a vehicle, wherein the vehicle is adapted to normally have a first airbag in the steering wheel and a second airbag in the dashboard; said method comprising the steps of:

(a) providing an electrical circuit that includes an indicator light;

(b) installing a first cover on the steering wheel;

(c) installing a second cover on the dashboard, so that when both covers are installed said electrical circuit operates such that said indicator light transitions from an on condition to an off condition.

2. The method of claim 1, wherein said electrical circuit means includes a first light energizer circuit in the steering wheel, and a second light energizer circuit in the dashboard.

3. The method of claim 2, wherein step (b) involves a sub-step of interrupting the first light energizer circuit, and step (c) involves a sub-step of interrupting the second light energizer circuit.

4. The method of claim 3, wherein the first energizer circuit includes a first shorting bar in the steering wheel, and the second energizer circuit includes a second shorting bar in the dashboard.

5. The method of claim 4, wherein the sub-step of interrupting the first light energizer circuit involves a deflection of the first shorting bar, and the sub-step of interrupting the second light energizer circuit involves a deflection of the second shorting bar.

* * * * *